H. DALTON.
GRINDER COUNTER SHAFT.
APPLICATION FILED OCT. 7, 1916.
1,213,594.
Patented Jan. 23, 1917.
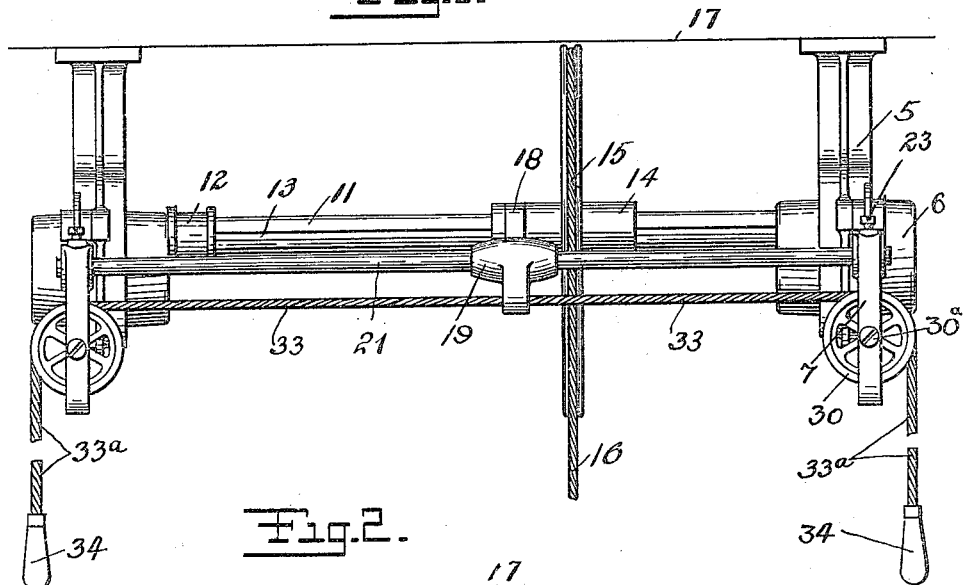
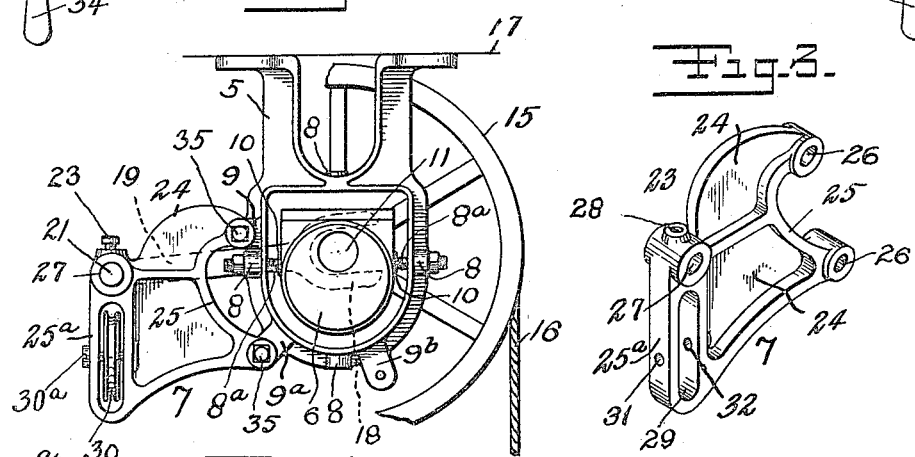
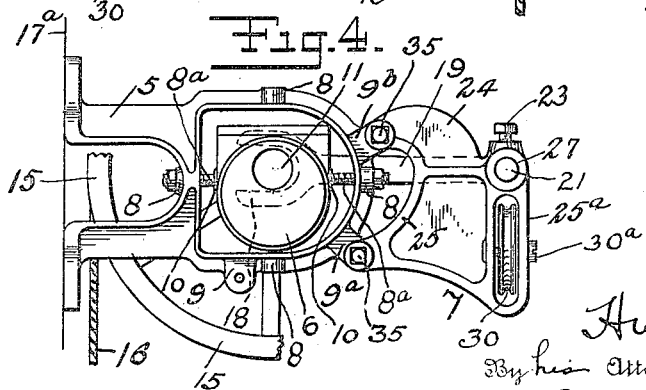

UNITED STATES PATENT OFFICE.

HUBERT DALTON, OF NEW YORK, N. Y.

GRINDER COUNTER-SHAFT.

1,213,594.  Specification of Letters Patent. Patented Jan. 23, 1917.

Application filed October 7, 1916. Serial No. 124,235.

*To all whom it may concern:*

Be it known that I, HUBERT DALTON, a citizen of the United States, and a resident of the borough of Manhattan, in the city, county, and State of New York, have invented certain new and useful Improvements in Grinder Counter-Shafts; and I do hereby declare the following to be a full, clear, and exact description of the invention, such as will enable others skilled in the art to which it appertains to make and use the same.

This invention relates to improvements in counter-shafts for grinding mechanisms such as the grinder-attachments of lathes.

Heretofore the grinder of a lathe has been rotated by means of a belt coupling a pulley on the grinder shaft and a pulley on a line or counter-shaft. The grinder shaft is usually translated, either by being slidably mounted in its shaft bearings, or by being arranged on a movable carriage supporting these bearings. Such translation of the grinder shaft is required to permit the grinder to be moved over the work. Where the grinder shaft is driven by a belt passing over pulleys fixed on the grinder shaft and on the counter-shaft, the belt is made sufficiently slack to transmit power to the pulley on the grinder shaft when the grinder is so moved on the work as to bring the two pulleys out of line. The result is very unsatisfactory, since such a slack belt drives the grinder at different speeds relative to the presumably fixed speed of the pulley on the counter-shaft, according as the pulley on the grinder shaft is more or less out of line with the pulley on the counter-shaft. Even with such an unsatisfactory and unreliable arrangement, it is obvious that the field of work of the grinder, say with relation to a piece of work fixed within a lathe-chuck and rotating therewith, is very limited. In the case mentioned, if the surface on the work to be ground is considerable, the grinder must be moved away from the work and the chuck or the like readjusted several times before the grinding job is completed. To avoid these various difficulties it has been proposed to provide a counter-shaft carrying not a pulley, but a very long drum, so that the belt which passes over the pulley on the grinder shaft and the drum on the counter-shaft may slip lengthwise of the drum during rotation of the latter. This arrangement generally necessitates the provision of a belt shifter or the like. Such a drum drive is cumbersome, bulky, and uneconomical of power, and is in fact very seldom employed. Among attempts to avoid the disadvantages of the slack belt passing over pulleys fixed on the grinder and counter-shaft and of the drum drive, others in the art have proposed a grinder attachment to be mounted in its entirety in a frame suspended from the hub of the pulley on the counter-shaft. According to this obviously undesirable arrangement, the grinder shaft journaled in the lower part of the suspended frame has fixed thereon a pulley driven by the pulley on the counter-shaft through a belt passing over the two pulleys.

The present invention provides broadly an improved counter-shaft structure characterized by three principal advantages, first, that the sole operative connection between the counter-shaft and the grinder attachment may be a flexible belt always stretched to the same proper degree of tautness, second, that this taut belt passes over a pulley wheel on the counter-shaft, and, third, that the grinder is movable over the work within as wide limits as may be desired.

Another important object of the invention is to provide such a counter-shaft structure which is "reversible", that is, adapted for assembly in either of two ways, one adapting it for vertical suspension from a ceiling and the other adapting it to be mounted horizontally on a side wall, the mechanism being arranged to be controlled with equal facility in either position.

The preferred embodiment of the invention includes a counter-shaft suitably journaled at its opposite ends in a pair of spaced hangers, reversible brackets selectively mounted on the hangers in either of two positions, and pulley shifting mechanism carried by the brackets. An idler pulley is journaled in each of the brackets in such a way that, irrespective of the mounting of the brackets on the hangers, the pulley is always disposed vertically and parallel with the axis of the counter-shaft. The pulleys are pivoted on axes located below the horizontal plane of the guide-rod to simplify the construction and avoid binding of the shipper on the guide-rod in both positions of the hanger. A rod connects the brackets and has an end secured to each bracket, this rod being so arranged on the brackets that, irrespective of the mounting of the brackets on the hangers, the rod lies parallel with the counter-shaft and substantially horizontally offset therefrom. The counter-shaft has a pulley-wheel splined thereon, and a shipper slidably supported on the rod engages the hub of the pulley-wheel. Flexible cords are attached to the shipper and extend laterally therefrom over the idler pulleys on the brackets and then downwardly, their ends being provided with suitable handles. By pulling down on one or the other of these handles, the pulley may be shifted over a wide range to keep it in alinement with the driven wheel as the latter is moved to different working positions, as a result of which the driving connection is maintained and the belt kept taut under all conditions.

The present invention will be clearly understood from an examination of the following description, when taken in connection with the accompanying drawing, of which—

Figure 1 is a front elevation of the counter-shaft structure when suspended from a ceiling; Fig. 2 is a side elevation, illustrating the parts as viewed from the left of Fig. 1; Fig. 3 shows one of the brackets in perspective; and Fig. 4 is a view similar to Fig. 2, but looking toward the right, with the counter-shaft structure mounted on a side wall.

Hangers 5, journal boxes 6 and brackets 7 are duplicates. The hangers 5 and journal boxes 6, as such, form no part of the present invention, being fully described and claimed in a copending application Serial No. 124,234 filed by me on Oct. 7, 1916. It will be noted that each of the hangers 5 is provided with four equally spaced lugs 8, drilled and tapped to receive two set-screws $8^a$, either as shown in Fig. 2 or in Fig. 4, and three equally spaced lugs 9, $9^a$ and $9^b$, transversely apertured as indicated. Each of the journal boxes is provided with two oppositely offset lugs 10 to receive the set-screws; so that a counter-shaft 11 may have eccentric bearings in the upper parts of the journal boxes irrespective of whether the hangers are suspended from the ceiling as shown in Figs. 1 and 2, or mounted on a side wall as shown in Fig. 3.

The counter-shaft 11 has fixed thereon a single small driving pulley 12, which may be driven by a suitable belt (not shown) from another counter-shaft (also not shown). According to this arrangement, the second counter-shaft will of course be provided with a suitable clutch and preferably will be provided with a cone pulley to coöperate in the well known way with a pulley which operates the lathe (not shown) to rotate the work in the lathe when the clutch is moved to throw in this second counter-shaft. Throughout substantially its entire length the counter-shaft 11 has formed therein a key-way 13 with which engages a suitable key carried by the hub 14 of a large pulley-wheel 15. A rope-belt 16 passes over pulley-wheel 15, and over a pulley on the grinder shaft (not shown) for rotating the grinder relatively to the work in the lathe.

The fork 18 at the inner end of a shipper 19 engages an annular groove in the hub 14 of the pulley-wheel 15, and the outer end of the shipper 19 fits loosely over a guide-rod 21. This guide-rod and the brackets 7 are clamped together by means of set-screws 23.

Each bracket 7, as shown best in Fig. 3, is provided with a web 24, strengthening ribs 25 and $25^a$, two bolt holes 26, a hole 27 to receive an end of guide-rod 21, and a tapped hole 28 to receive the set-screw 23. Rib $25^a$ is slotted at 29 to accommodate a small idler pulley 30, loosely mounted on a screw $30^a$ passing through a hole 31 and having its end threaded into a tapped hole 32 in the bracket 7.

Attached to the shipper 19 are a pair of flexible cords 33, each of which passes over one of the small idler pulleys 30 and has a length $33^a$ depending below the bracket. The lower ends of these lengths $33^a$ of the cords 33 carry handles 34 within convenient reach of the machinist at the lathe.

When the hangers 5 are suspended from a ceiling 17, brackets 7 are mounted on the hangers as illustrated in Figs. 1 and 2. Then the bolt holes 26 of each bracket are arranged in registry with the bolt holes in the hanger lugs 9 and $9^a$ and each bracket is attached to its hanger 5 by means of suitable bolts 35.

When the hangers 5 are suspended from a side wall $17^a$, brackets 7 are mounted on the hangers as illustrated in Fig. 4. Then the bolt holes 26 of each bracket are arranged in registry with the bolt holes in the hanger lugs $9^b$ and $9^a$ and each bracket is attached to its hanger 5 by means of the same bolts 35.

When the hanger is suspended from a ceiling or mounted on a side wall, a downward pull on either of the handles 34 will cause the pulley wheel 15 to move toward the end of the counter-shaft adjacent that handle. Such a shifting of the pulley wheel takes place during the rotation of the counter-shaft and while the grinder is being driven by the belt 16. It will thus be seen that the machinist may conveniently shift the pulley-wheel 15 back and forth on the counter-shaft 11 while moving the grinder over a considerable surface of the work, even while the work is being continuously rotated with the lathe chuck or other suitable support. The pulley on the grinder shaft and the pulley-wheel 15 may thus always be kept in line and the belt 16 always maintained properly taut. The work of shifting the pulley-wheel 15 during the grinding operation is very slight, since the instant this pulley-wheel and the pulley on the grinder shaft get out of line, the belt 16 becomes more taut and tends to urge the pulley-wheel 15 to return to alinement with the pulley on the grinder-shaft.

It is obvious that the construction illustrated herein may be variously modified and yet not depart from the scope of the invention as particularly indicated by the appended claims.

I claim:

1. In a device of the kind described, the combination with the counter-shaft and counter-shaft hangers, of a pulley keyed on the counter-shaft and movable in the direction of the length of the counter-shaft, a pair of brackets each adapted to be mounted in either of two positions on the hangers, a shipper for the pulley, means attached to the shipper for actuating the shipper to move the pulley on the counter-shaft in one direction or the other, and guiding means for the shipper-actuating means carried by the brackets.

2. In a device of the kind described, the combination with the counter-shaft and counter-shaft hangers, of a pulley keyed on the counter-shaft and movable lengthwise thereof, a pair of brackets each adapted to be mounted in either of two positions on the hangers, a shipper for the pulley, means attached to the shipper for actuating the shipper to move the pulley on the counter-shaft in one direction or the other, guiding means for the shipper actuating means carried by the brackets, and guiding means for the shipper carried by the brackets.

3. In a device of the kind described, the combination with the counter-shaft and counter-shaft hangers, of a pulley keyed on the counter-shaft and movable lengthwise thereof, a pair of brackets each adapted to be mounted in either of two positions on the hangers, a pulley journaled in each bracket, a shipper for the pulley on the counter-shaft, and operating means for the shipper including flexible cord lengths attached to the shipper and passing over the pulleys.

4. In a device of the kind described, the combination with the counter-shaft and counter-shaft hangers, of a pulley keyed on the counter-shaft and movable lengthwise thereof, a pair of brackets each adapted to be mounted in either of two positions on the hangers, a pulley journaled in each bracket, a shipper for the pulley on the counter-shaft, flexible cord lengths attached to the shipper and passing over the pulleys on the brackets, and a guide-rod for the shipper secured at its opposite ends to the brackets.

5. In a device of the kind described, in combination, a counter-shaft, a pulley keyed on the shaft but adapted for movement lengthwise thereof, reversible hangers for the shaft whereby the shaft may be suspended from a ceiling or mounted on a side wall, a pair of brackets one supported by each hanger, a rod fixed to and joining the brackets, means carried by the brackets and hangers for mounting the brackets on the hangers in position to hold the rod horizontally offset from the counter-shaft when the hangers are in either of their two positions, and a device carried by the rod and movable thereon to shift the pulley lengthwise of the shaft.

6. In a device of the kind described, in combination, a counter-shaft, a pulley keyed on the shaft but adapted for movement lengthwise thereof, reversible hangers for the shaft whereby the shaft may be suspended from a ceiling or mounted on a side wall, a pair of brackets one supported by each hanger, a rod fixed to and joining the brackets, means carried by the brackets and hangers for mounting the brackets on the hangers in position to hold the rod horizontally offset from the counter-shaft when the hangers are in either of their two positions, and means carried by the brackets and rod and actuable from a comparatively remote point to shift the pulley lengthwise of the shaft.

7. In a device of the kind described, in combination, a counter-shaft, a pulley keyed on the shaft but adapted for movement lengthwise thereof, reversible hangers for the shaft whereby the shaft may be suspended from a ceiling or mounted on a side wall, a pair of brackets one supported by each hanger, a rod fixed to and joining the brackets, means carried by the brackets and hangers for mounting the brackets on the hangers in position to hold the rod horizontally offset from the counter-shaft when the hangers are in either of their two positions, a device carried by the rod and movable thereon to shift the pulley lengthwise of the shaft, and flexible means looped over the brackets for moving the device.

8. In a device of the kind described, in combination, a counter-shaft, a pulley keyed on the shaft but adapted for movement lengthwise thereof, reversible hangers for the shaft whereby the shaft may be suspended from a ceiling or mounted on a side wall, a pair of brackets one supported by each hanger, a rod fixed to and joining the brackets, means carried by the brackets and hangers for mounting the brackets on the hangers in position to hold the rod horizontally offset from the counter-shaft when the hangers are in either of their two positions, a pulley revolubly mounted on each bracket with the flat of the pulley facing the shaft, a shipper sleeved on the rod and engaging the pulley on the shaft, and flexible cable lengths attached to the shipper and passing over the pulleys on the brackets.

9. The combination of a counter-shaft, a pulley splined thereon, reversible hangers for supporting the counter-shaft adapted to be mounted in a horizontal or a vertical position, means for shifting the pulley axially upon the counter-shaft, supports for the shifting means, and means for securing said supports to the hangers in one position when the hangers are mounted horizontally and in another position when the hangers are mounted vertically.

10. The combination of a counter-shaft, a pulley splined thereon, reversible hangers for the counter-shaft adapted to be mounted in a vertical or a horizontal position, a pair of brackets each adapted to be secured to one of the hangers in either of two positions and means carried by the brackets for shifting the pulley axially upon the counter-shaft.

11. The combination of a counter-shaft, a pulley splined thereon, a pair of reversible hangers supporting the counter-shaft and adapted to be mounted in either a horizontal or a vertical position, a shifter for moving the pulley axially upon the counter-shaft, actuating means for the shifter, and supports for the actuating means and shifter adapted to be secured to the brackets in either of two positions displaced one from the other by substantially 90 degrees about the axis of the shaft.

12. The combination of a counter-shaft, a pulley splined thereon, a pair of reversible hangers for supporting the counter-shaft and adapted to be mounted in either a vertical or a horizontal position, a pair of brackets each adapted to be mounted upon one of the hangers in either of two positions, one of which is displaced angularly from the other, a rod carried by the brackets, a shifter for the pulley carried by the rod, pulleys on the brackets, and flexible cords passing over the pulleys and secured to the shifter.

In testimony whereof I affix my signature.

HUBERT DALTON.

Copies of this patent may be obtained for five cents each, by addressing the "Commissioner of Patents, Washington, D. C."